Feb. 15, 1927. 1,617,561
T. M. ALEXOVITS
SINTERING APPARATUS
Filed Feb. 5, 1926  2 Sheets-Sheet 2
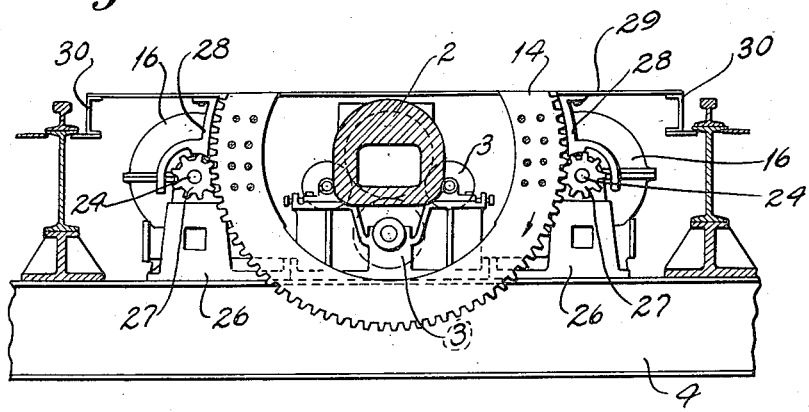
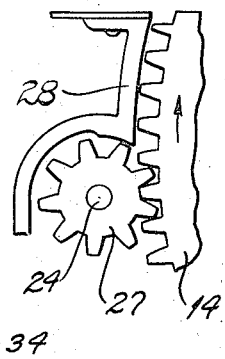
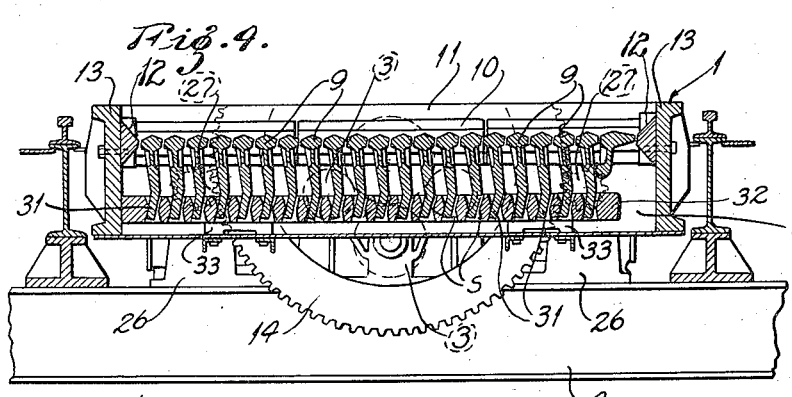
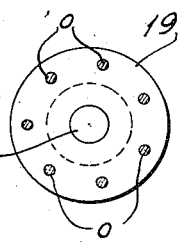
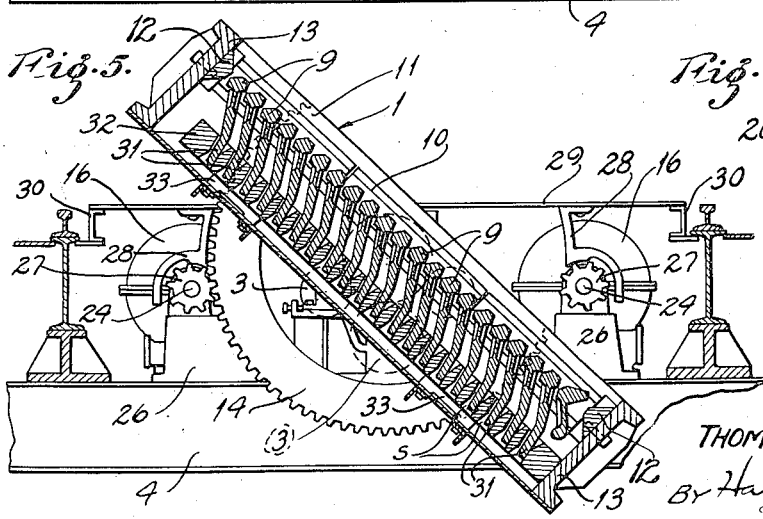
INVENTOR
THOMAS M ALEXOVITS.
By Harry A. Bennel
ATTORNEY Patented Feb. 15, 1927.

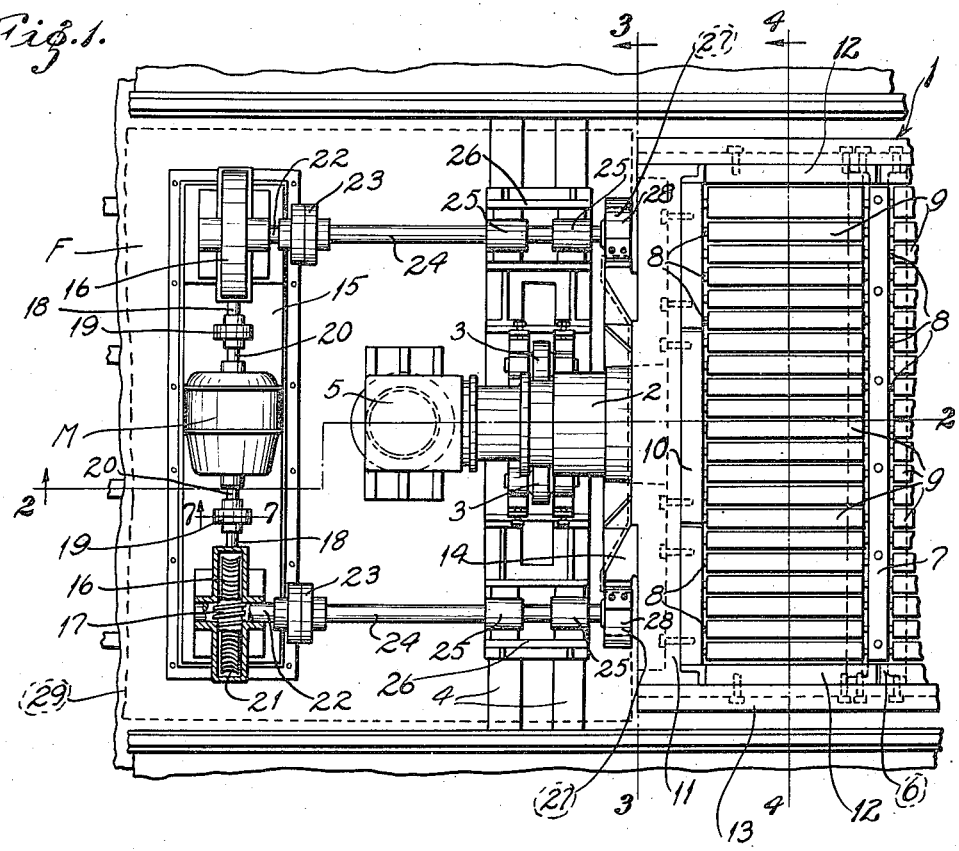

1,617,561

UNITED STATES PATENT OFFICE.

THOMAS M. ALEXOVITS, OF BAYONNE, NEW JERSEY, ASSIGNOR TO JOHN E. GREENAWALT, OF NEW YORK, N. Y.

SINTERING APPARATUS.

Application filed February 5, 1926. Serial No. 86,223.

My invention has relation to improvements in holders for treating metalliferous products for the purpose of sintering or agglomerating the same, such holders being in common use in the ore-sintering art, said improvements being directed more particularly to the dumping mechanism of the pan, including both the external gear arrangement and the movement of grates within the pan. The invention consists in the novel details of construction more fully set forth in the specification and pointed out in the claims.

In order that other mechanism such as the car for charging the sintering pan and the igniter for igniting the charge may pass freely over the pan, it is necessary that no part of the dumping mechanism project above the top surface of the pan, and heretofore, there was mounted on the pan trunnion a gear segment (said segment being somewhat more than 180 degrees) said segment being driven by a pinion to rotate the pan to inverted position for dumping after which the motion was reversed to restore the pan to its normal position. In an arrangement of this kind, it is necessary to exercise extreme caution in dumping the pan so that the rotation thereof be stopped after passing through an arc of 180 degrees, otherwise the gear segment would run off of the pinion and cause considerable difficulty and perhaps damage to the parts. Furthermore, the motion of the pinion had to be reversed for the purpose of reverting the pan to its normal position, it being impossible to continuously rotate the pan through an arc of 360 degrees. I have overcome these difficulties by providing a pair of drive pinions for the gear segment, said pinions being diametrically opposed and rotated in synchronism so that when a gear segment passes beyond one pinion, the opposite pinion will continue to drive said segment and at such time as the gear segment passes beyond the second pinion, it will again have come into mesh with the first pinion which continues the rotating action. Thus it is possible under my improved gear segment to spin the sintering pan through a complete circle or 360 degrees which in fact is done every time the pan is dumped. It is also possible under this arrangement of gears to rotate the pan more rapidly than could heretofore be done, thus speeding up the dumping operation, and obviously, increasing the number of charges or the daily capacity of the pan.

In order to insure a thorough dumping of the charge from the pan, I have provided an improved grate construction, the grate being composed of a plurality of grate bars pivotally mounted in the pan, said grate bars having suitable connection with a bar weight therebelow, the bar weight being reciprocated on rotating the pan to upright position and rocking the grate bars to effect a shearing motion of the adjacent edges of any two bars thus breaking out any sinter that may be lodged between the bars or fused to them. Further advantages of my improved dumping mechanism will be better apparent from a detailed description of the invention in connection with the accompanying drawings in which:—

Fig. 1 is a top plan of one end of my improved sintering pan showing the pinions for rotating the same and driving mechanism associated therewith; Fig. 2 is a vertical longitudinal section taken on the line 2—2 of Fig. 1; Fig. 3 is a vertical transverse section taken on the line 3—3 of Fig. 1; Fig. 4 is a vertical transverse section taken on the line 4—4 of Fig. 1; Fig. 5 is a section similar to Fig. 4 except that the pan is shown partially rotated on its way to its dumping position; the maximum dumping position, of course, is the complete inversion of the pan; Fig. 6 is an enlarged view of one pinion and part of the gear segment meshing therewith and the guard or shield therefor which prevents fine material from falling between the teeth of said pinion and gear, and Fig. 7 is a cross sectional detail taken on the line 7—7 of Fig. 1.

Referring to the drawings, 1 represents a sintering pan having formed on each end a hollow trunnion 2 mounted on suitable roller bearings 3 supported on structural members 4, 4 each of said trunnions having air-tight connection with a fitting 5 which leads to an exhauster not shown. These parts are old in the art and will not be described in detail. Extending transversely across the pan are a plurality of ribs 6 on which are supported bearing blocks 7 which receive the trunnions 8, 8 of rocking grate bars 9. The grate bars 9 of the end rows of bars have their outer trunnions 8 mounted in an end dead plate 10 secured to the inner surface of the end wall 11 of the pan 1. In order to prevent the air from being drawn down along the sides of the holder, side dead plates 12 are secured against the side walls 13 of the pan. The grate construction thus far described is also old in the art as rocking grates form the subject of Patent No. 1,388,335 dated August 23, 1921, and issued to John E. Greenawalt. However, the means of producing the rocking motion about to be described is new and forms a part of the subject matter of the present invention. Before proceeding, however, with the description of the grate bar rotating mechanism, the mechanism for rotating the sintering pan will be described.

The pan rotating mechanism comprises the following:

A gear segment 14 is bolted onto one end of the pan 1, said gear being concentric with the trunnion 2 and its top edge defined by a chord lying in the same plane as the top edge of the pan so that there are no obstructions to interfere with the other apparatus (charge car and igniter not shown) operating over the pan. A base plate 15 is secured on a floor F of the structure housing the sintering apparatus, and a driving unit, comprising a motor M and two worm gear reducers 16, 16 is mounted on said base plate. The worm gear reducers each comprise a worm 17 on a shaft 18 directly connected by a coupling 19 to the motor shaft 20, and a worm gear 21 mounted on a shaft 22. Each worm gear shaft 22 is connected by a coupling 23 to a counter shaft 24 mounted in bearings 25, 25 fixed on a base block 26.

Pinions 27, 27 are fixed on the extremities of the shafts 24, 24, said pinions meshing with the gear 14 at substantially diametrically opposite points. In order readily to get the two sets of gear trains to mesh with a common gear, both pinions 27 being driven from one motor shaft 20, one of the couplings 19 has seven holes o in the flanges (Fig. 7) while the other coupling has eight such holes. Therefore, by turning the members of one coupling 19 relatively one hole in one direction and the members of the other coupling 19 relatively one hole in the opposite direction, the positions of the pinions 27 may be readily adjusted to the degree of accuracy necessary for the meshing of said pinions with the segment gear 14.

In order to rotate the pan 1 to dumping position, the motor M is set in operation to rotate the pinions 27, 27 in the same direction, said pinions driving the gear segment 14 in the direction indicated by the arrow (Fig. 6) and with it the pan 1. Obviously, any fine material which is lodged on the upper surface of the end wall 11 of the pan will slide downwardly as said pan is tilted and, of course, if there is any such material on the top flange of the gear segment, this material will slide off the gear segment, and were not some measures taken to prevent it, would drop down between the right hand pinion (Fig. 6) and gear teeth. In order to prevent this material from thus lodging between the gear teeth, I place a guard 28 adjacent to the gear teeth, said guard being so formed as to parallel the gear teeth down to their point of intersection with the teeth of pinion 27, the guard then enveloping the upper half of the pinion. The inner face of the guard is brought as closely to the teeth as possible, and the last tooth on each side of the gear segment 14 is reduced in thickness to about one half that of the outer teeth so that as the gear travels downwardly, any material that may be discharged from the top flange thereof will pass through the space left by the thin tooth as it passes through the pinion teeth and will fall therefrom after this thin tooth is beyond the pinion. Guards 28 are provided for both pinions 27 and are secured to the under side of a platform or plate 29 supported by channels 30, 30 above the pan rotating mechanism (Fig. 2), the edge of the plate 29 adjacent to the pan 1 being shaped to conform to the pan and gear 14 (see dotted outline of platform 29 in Fig. 1).

Referring again to the grate bars 9, each of said grate bars has a lever arm 31 depending from its under side, the extremity of said lever arm projecting into a slot s in the bar weight 32, said bar weight as will be seen in Fig. 4, is slidingly mounted in two pairs of guides 33, projecting from the bottom of the pan 1 and the bar 32 extends transversely across the pan with a clearance space 34 between the end of the bar and the right side of the pan when the pan is in its normal position (Fig. 4). If the pan is now rotated to a position as shown in Fig. 5 which is the angle of friction of the bar weight, said weight will slide so as to contact with the right hand side of the pan and in so doing imposes a sudden motion to the grate bars 9, rocking said bars on their trunnions and producing a shearing effect between the adjacent edges of any two bars, thus dislodging any material that may be fused to the bars so that this material will be ejected from the pan on completing the rotation thereof to inverted position. By the time the pan has been completely inverted, the contents thereof will have been discharged and the pan may now be reverted by continuing the rotation thereof in the same dircetion until the pan has been rotated through an arc of 360 degrees and has returned to its normal position as shown in Fig. 4. Obviously, when the pan has been rotated 180 degrees beyond the position shown in Fig. 5, the bar weight 32 will slide back to its normal position and rock the grate bars 9 to their normal positions as shown in Fig. 4. From the foregoing it is apparent that the operation of dumping my improved sintering pan is extremely simple, requiring merely that the motor M be set in motion, allowing the gears to rotate the pan slowly through a complete circle, the contents of the pan being discharged while the pan is inverted and the grate bars being rocked to facilitate the discharge of material from the pan and being restored to their normal positions, all of which takes place automatically during the rotation of the pan.

Having described my invention, I claim:

1. A sintering apparatus comprising a holder, a plurality of grate bars pivotally mounted in said holder, means for inverting said holder, and means arranged below said grate bars for collectively oscillating a group of the bars on inverting the holder.

2. A sintering apparatus comprising a holder, a plurality of grate bars pivotally mounted in said holder, means for inverting said holder, and means arranged below the grate bars and connected to a series of said bars for oscillating simultaneously said series of bars on moving the holder to inverted position.

3. A sintering apparatus comprising a holder, a plurality of grate bars pivotally mounted in said holder, means for inverting said holder, and means arranged below said bars adapted to be actuated on inverting the pan to impart movement collectively to a group of said bars by percussion.

4. A sintering apparatus comprising a holder, a plurality of grate bars pivotally mounted in said holder, means for inverting said holder, a bar weight mounted below the grate bars and extending transversely thereto, an arm depending from each of said bars and traversing a slot in the bar weight, said bar weight being slidable to one side of the holder on inverting the same, and operating to rock the grate bars in its movement.

5. A sintering apparatus comprising a holder having trunnions on which the holder is rotatable, a gear segment secured to one end of said holder, said gear segment lying wholly below the top surface of the holder, a pair of pinions adapted to mesh with said gear and mounted at substantially diametrically opposite points, and means for rotating said pinions in synchronism whereby the holder may be rotated by either or both of said pinions.

6. A sintering apparatus comprising a rotatable holder, a gear segment secured to one end of said holder, a pair of pinions adapted to mesh with said gear segment, said pinions being spaced relative to one another so that one of them is always in mesh with the gear segment, and means for rotating said pinions in synchronism.

7. A sintering apparatus comprising a rotatable holder, a gear segment secured to one end of said holder, a pair of pinions adapted to mesh with said gear segment, said pinions being spaced relative to one another so that one of them is always in mesh with the gear segment, means for rotating said pinions in synchronism, and a shield for the pinions and that part of the gear immediately above.

8. A sintering apparatus comprising a rotatable holder, a gear segment secured to one end of said holder, a pair of pinions adapted to mesh with said gear segment, said pinions being spaced relative to one another so that one of them is always in mesh with the gear segment, means for rotating said pinions in synchronism, and means for shielding the gear and pinions to prevent fine material from entering therebetween.

9. A sintering apparatus comprising a rotatable holder, a gear segment secured to one end of said holder, a pair of pinions adapted to mesh with said gear segment, said pinions being spaced relative to one another so that one of them is always in mesh with gear segment, a driving motor for the pinions, and a reducing gear between each of said pinions and the motor.

10. A sintering apparatus comprising a rotatable holder, a gear segment secured to one end of said holder, a pair of pinions adapted to mesh with said gear segment, said pinions being spaced relative to one another so that one of them is always in mesh with the gear segment, means for rotating said pinions in synchronism, a platform disposed above said pinion rotating means, the margin of said platform adjacent to the holder conforming to the shape of said holder and segment gear and being sligthly spaced therefrom, and a shield for the pinions and that part of the gear immediately above, said shield being secured to the underside of said platform.

11. A sintering apparatus comprising a holder, a plurality of grate bars pivotally mounted in said holder, means for rotating said holder, and means for rocking the grate bars away from their normal supporting plane effective thereon during the rotation of the pan to inverted position, said grate bar rocking means operating to restore the bars to normal position on continuing the rotation of the holder.

In testimony whereof I hereunto affix my signature.

THOMAS M. ALEXOVITS.